No. 883,385. PATENTED MAR. 31, 1908.
H. P. C. BROWNE & W. H. PALMER, Jr.
ROTATION INDICATING INSTRUMENT.
APPLICATION FILED JULY 12, 1905.

2 SHEETS—SHEET 1.

Witnesses
Geo. H. Bywell.
Harry V. Ruelsam.

Inventors
H. P. C. Browne.
W. H. Palmer, Jr.
By Wilkinson & Fisher
Attorneys

No. 883,385. PATENTED MAR. 31, 1908.
H. P. C. BROWNE & W. H. PALMER, Jr.
ROTATION INDICATING INSTRUMENT.
APPLICATION FILED JULY 12, 1905.
2 SHEETS—SHEET 2.
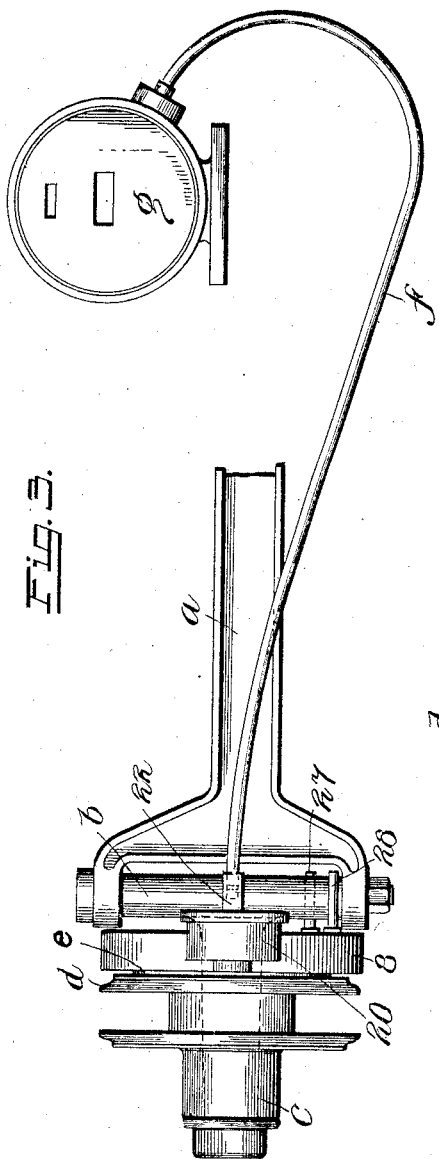
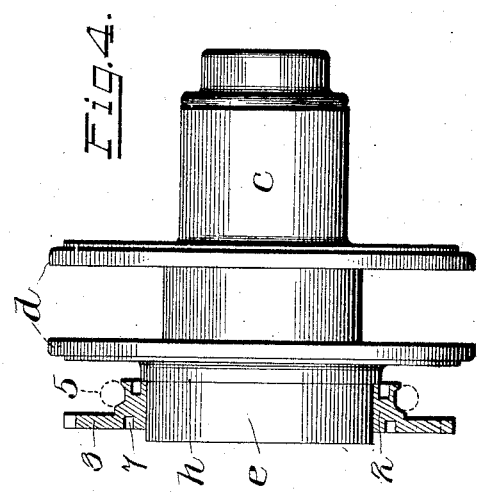

UNITED STATES PATENT OFFICE.

HARRY P. C. BROWNE AND WILLIAM H. PALMER, JR., OF NEW YORK, N. Y.

ROTATION-INDICATING INSTRUMENT.

No. 883,385. Specification of Letters Patent. Patented March 31, 1908.

Application filed July 12, 1905. Serial No. 269,416.

*To all whom it may concern:*

Be it known that we, HARRY P. C. BROWNE and WILLIAM H. PALMER, Jr., both citizens of the United States, residing at New York, borough of Brooklyn, county of Kings, and State of New York, and borough of Manhattan, county of New York, and State of New York, respectively, have invented certain new and useful Improvements in Rotation-Indicating Instruments; and we do hereby declare the following to be a full, clear, and exact description of the invention, such as will enable others skilled in the art to which it appertains to make and use the same.
Our invention relates to improvements in apparatus for operating any of the well known rotation indicating or registering or recording instruments, by imparting to the said instruments a measure of the rotation of a rotating shaft or wheel.

According to the present practice, such apparatus ordinarily comprises two members; one secured to the rotating part and another secured to some fixed part in the vicinity thereof, the two members being separate and distinct; and it is found extremely difficult in practice to maintain the necessary coöperation between the fixed and the rotating members.
According to our invention we combine the two coöperating members in a single unitary structure which is applied to the shaft or wheel, whose rotation is to be indicated, at a single operation and we connect this structure to some adjacent fixed object.

Our invention has been embodied in one of the simplest forms in the apparatus which is shown in the accompanying drawings, in which the same parts are indicated by the same letters throughout the several views.

Figure 1:
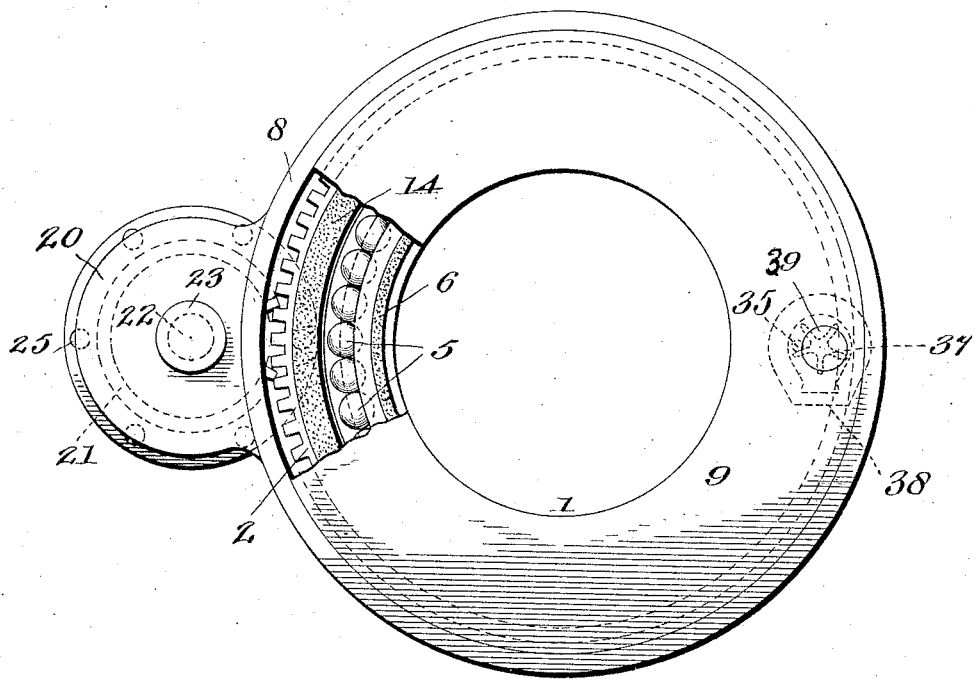
Figure 2:
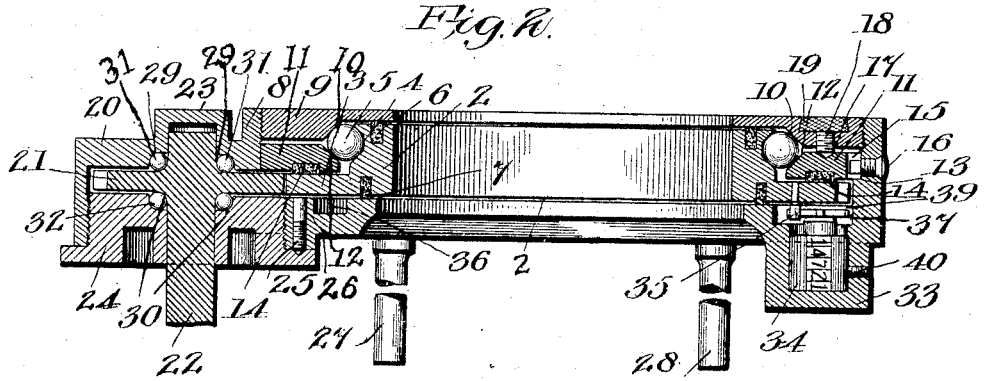

Figure 1 is a side elevation, parts being broken away, of the device detached. Fig. 2 shows a horizontal central section of the device. Fig. 3 shows a device applied to the front axle of an automobile and connected up to a registering instrument and Fig. 4 is an enlarged view of the hub, showing the device applied thereto. Figs. 3 and 4 are diagrammatic views omitting all the parts not necessary to the understanding of the invention.

The device consists primarily of an internal and an external member. The internal member consists preferably of a ring 2 of suitable thickness, which has on one edge a toothed circular gear wheel 3. The ring 2 is cut away, as shown at 4, to form part of a race for the reception of the anti-friction balls 5, and the internal member is cut away to form annular grooves for the reception of the dust excluding rings 6 and 7, which are preferably made of leather or felt. The ring 2 is preferably mounted on and turns with the hub or rotary body whose motion is to be indicated. The external member comprises the non-rotating parts and includes the ring 9 screwed into the ring 8, as shown in Fig. 2, beneath which is the ring 11, which is provided with a packing ring 14 of leather or felt bearing against the face of the gear wheel 3. Bearing faces 10 and 12 are provided on the rings 9 and 11 respectively, which with the face 4 on the ring 2, form the ball race for the balls 5. The ring 8 is provided with a shoulder 13 to keep the ring 11 clear of the gear wheel 3. The ring 11 is provided with one or more slots 15, shown in Fig. 2, into each of which is screwed a stud 16, which is then riveted in place, thus securing the ring 11 against circumferential displacement. One face of the ring is provided with a series of countersunk holes, 17, with which set screws 18 engage, which thus serve to hold the ring 11 in place and to lock the whole structure together.

19 represents a seal of lead or similar material which is compressed into undercut grooves immediately over the heads of the set screws.

On one side the ring 8 is extended out to form a circular boss or projection 20, within which is located the pinion 21, which meshes with the gear wheel 3, and which is provided with a shaft 22, to which a flexible shaft *f*, Fig. 3 is attached, which flexible shaft is connected with the recording or indicating device *g*. Of course, any suitable transmitting means could be used instead of a flexible shaft. The boss 20 is provided with a hollow extension 23 in which one end of the shaft 22 engages, and on the opposite side of the pinion 21 the shaft 22 is supported by a circular plug 24, which screws into a recess in the part 8. To prevent the displacement of the plug 24, we have provided a number of set screws 25 passing through the part 8 and into the plug 24. These set screws are preferably located below the surface of the part 8, and wooden pins 26 may be driven in to fill up the upper part of the holes thus left. Preferably the ring 8 is provided with two projecting pins 27 and 28 which are adapted to extend over and engage with some portion of the vehicle to anchor the ring 8 against rotation. Obviously, any suitable device for holding the ring 8 against rotation may be adopted. The part 8 is provided on its interior with a curved face 29, and the plug 24 is provided with a curved interior face 30. Similar curved faces are formed at the junctions of the pinion 21 and its shaft 22, said curved faces forming with the curved faces 29 and 30 two ball races for the reception of the rows of anti-friction balls 31 and 32, which hold the pinion firmly in place while allowing it to rotate freely.

It may be found desirable in certain classes of service, to supplement the indicating instruments mounted upon the vehicle body by another instrument, preferably a cyclometer, mounted in the same structure, with the operating means and operated directly thereby. The mounting of this instrument should afford at once ready visibility of the record or indication and protection against accident, unwarranted interference and the entrance of injurious matter. To this end our invention contemplates the construction upon the ring 8 of a boss or shell 33, located substantially opposite to the boss or extension 20, and which boss may be either made integral with the ring 8 or secured thereto in any suitable manner. The internal cross section of the boss 33 is designed to afford a snug fit for the barrel 34 of a cyclometer, the latter being preferably of the star wheel type. The complementary striking device 35 is secured in any suitable manner to one face of the gear wheel 3, and is located some distance inside of the outer edge of said gear wheel, whereby an adequate clearance is allowed between the gear wheel and its pinion. The ring 8 is provided with a circular groove 36 which groove affords a free path for the movement of the striking device. On each complete rotation of the gear wheel 3 the striking device 35 comes in contact with the star wheel 37 of the cyclometer and a distance record is thereby secured, which affords a check upon the instrument operated by the shaft 22. It will be observed that the operative relation between the striker 35 and the star wheel 37 is not subject to accidental variations.

The record of the cyclometer is visible through a window 38 underneath which is inserted a pane of some transparent material, preferably glass, for the purpose of closing the compartment. The cyclometer is introduced into place through the opening 39 before the parts 1, 11, and 9 are put in place, and is maintained in operative relation with respect to the striker 35 by any suitable means, preferably by set screws 40 passing through the boss 33 and into the cyclometer, said set screws being riveted and sealed, as described in connection with the set screws 18.

It will be noted that the outer member and the inner member together form an annular box or casing, which is substantially dust tight, as shown most clearly in Fig. 2.

In Figs. 3 and 4, $a$ represents a part of the front axle of an automobile on the end of which is mounted the swivel $b$ on which the wheel axle is supported, the whole constituting an ordinary steering means. $c$ represents the hub provided with flanges $d$ between which the spokes are held. The hub $c$ has on it a portion $e$ upon which the device shown in Figs. 1 and 2 is mounted, with a driving fit, and is provided with a shoulder $h$ which prevents the device from being driven on too far upon the hub. $g$ represents any non-contiguous indicating or recording instrument, such as a taximeter, and $f$ represents a flexible shaft connecting said instrument with the operating means, namely the part 22.

We claim as our invention:—

1. A rotation indicating apparatus comprising two members, the one held against rotation and the other rotary, and the two connected together to form a unitary structure, with rotary means carried by said non-rotating member for transmitting a measure of the rotation of the rotary member to a separate indicating instrument, substantially as described.

2. A rotation indicating apparatus comprising two annular members, the one held against rotation and the other rotary, and the two connected together to form a unitary structure, with rotary means carried by said non-rotating member for transmitting a measure of the rotation of the rotary member to a separate indicating instrument, substantially as described.

3. A rotation indicating apparatus comprising two members, the one held against rotation and the other rotary, and the two connected together to form a unitary structure, a separate indicating instrument, with rotary means carried by said non-rotating member for transmitting a measure of the rotation of the rotary member to said indicating instrument, substantially as described.

4. In an apparatus of the character described, the combination with two members secured together to form a unitary structure, the one fixed and the other rotary, of rotary means carried by the fixed member and actuated by the rotary member for transmitting a measure of the rotation of the rotary member, and separate means operated by said transmitting means, for indicating the motion of the rotary member, substantially as described.

5. In an apparatus of the character described, the combination with two annular members secured together to form a unitary structure, the one fixed and the other rotary, of means carried by the fixed member and actuated by the rotary member for transmitting a measure of the rotation of the rotary member, and independent means operated by said transmitting means, for indicating the rotation of the rotary member, substantially as described.

6. In an apparatus of the character described, the combination with two members secured together to form a unitary structure, the one fixed and the other rotary, of means carried by the fixed member and actuated by the rotary member for transmitting a measure of the rotation of the rotary member, a registering instrument mounted in the same structure with and operated by the rotary member, and independent means operated by said transmitting means, for indicating the rotation of the rotary member, substantially as described.

7. In an apparatus of the character described, the combination with two annular members secured together to form a unitary structure, the one fixed and the other rotary, of means carried by the fixed member and actuated by the rotary member for transmitting a measure of the rotation of the rotary member, a registering instrument mounted in the same structure with and operated by the rotary member, and independent means operated by said transmitting means, for indicating the rotation of the rotary member, substantially as described.

8. The combination of an axle having a pivoted end, a hub journaled on the pivoted end of said axle, and revolution counting mechanism carried by said hub, and driven by the rotation thereof, but held in operative relation by said axle, substantially as described.

9. The combination of an axle having a pivoted end, a hub journaled on the pivoted end of said axle, a counter operator carried by said hub and driven by the rotation thereof, but held in operative relation by said axle, a registering instrument, and a flexible shaft connecting said counter operator with said registering instrument, substantially as described.

10. In an apparatus of the character described, the combination with a rotary inner member and a fixed outer member, the two forming in effect a closed casing, and the inner member being provided with gear teeth, of a pinion journaled in the fixed member and meshing with said gear teeth, a separate indicating apparatus, and means for connecting said pinion with said indicating apparatus, substantially as described.

11. In an apparatus of the character described, the combination with a rotary inner member and a fixed outer member, the two forming in effect a closed casing, and the inner member being provided with gear teeth, of a pinion journaled in the fixed member and meshing with said gear teeth, a separate indicating apparatus, and a flexible shaft connecting said pinion with said indicating apparatus, substantially as described.

12. In an apparatus of the character described, the combination with a rotary inner member and a fixed outer member, the two forming in effect a closed casing, and the inner member being provided with gear teeth, with ball bearings between the two members, of a pinion journaled in the fixed member and meshing with said gear teeth, a separate indicating apparatus, and means for connecting said pinion with said indicating apparatus, substantially as described.

13. In an apparatus of the character described, the combination with a rotary inner member and a fixed outer member, the two forming a substantially dust proof casing, and the inner member being provided with gear teeth, with ball bearings between the two members, of a pinion journaled in ball bearings in the fixed member and meshing with said gear teeth, a separate indicating apparatus, and means for connecting said pinion with said indicating apparatus, substantially as described.

14. In an apparatus of the character described, the combination with a rotary inner member and a fixed outer member, the two forming a substantially dust proof casing, and the inner member being provided with gear teeth, with ball bearings between the two members, of a pinion journaled in ball bearings in the fixed member and meshing with said gear teeth, a separate indicating apparatus, and a flexible shaft connecting said pinion with said indicating apparatus, substantially as described.

15. In an apparatus of the character described, the combination with a rotary inner member and a fixed outer member, the two forming a substantially dust proof casing, and the inner member being provided with gear teeth, of a pinion journaled in the fixed member and meshing with said gear teeth, a separate indicating apparatus, a flexible shaft connecting said pinion with said indicating apparatus, and a cyclometer carried by said outer member and actuated by said inner member, substantially as described.

16. In an apparatus of the character described, the combination with a rotary inner member and a fixed outer member, the two forming a substantially dust proof casing, and the inner member being provided with gear teeth, with ball bearings between the two members, of a pinion journaled in the fixed member and meshing with said gear teeth, a separate indicating apparatus, means for connecting said pinion with said indicating apparatus, and a cyclometer carried by said outer member and actuated by said inner member, substantially as described.

17. In an apparatus of the character described, the combination with a rotary inner member and a fixed outer member, with dust guards interposed between the two members, the two forming a substantially dust proof casing, and the inner member being provided with gear teeth, of a pinion journaled in the fixed member and meshing with said gear teeth, a separate indicating apparatus, and means for connecting said pinion with said indicating apparatus, substantially as described.

18. In an apparatus of the character described, the combination with a rotary inner member and a fixed outer member, with dust guards interposed between the two members, the two forming a substantially dust proof casing, and the inner member being provided with gear teeth, of a pinion journaled in the fixed member and meshing with said gear teeth, a separate indicating apparatus, and a flexible shaft connecting said pinion with said indicating apparatus, substantially as described.

19. In an apparatus of the character described, the combination with a rotary inner member and a fixed outer member, with dust guards interposed between the two members, the two forming a substantially dust proof casing, and the inner member being provided with gear teeth, with ball bearings between the two members, of a pinion journaled in the fixed member and meshing with said gear teeth, a separate indicating apparatus, means for connecting said pinion with said indicating apparatus, and a cyclometer mounted in a dust proof chamber in said outer member, substantially as described.

20. In an apparatus of the character described, and adapted for substantially concentric mounting upon a wheel, the combination with two annular members secured together to form a unitary structure, the one fixed and the other rotary, the two members forming in effect an annular closed casing, with a cyclometer for indicating a measure of the rotation of the rotary member, substantially as described.

21. In an apparatus of the character described, the combination of two members secured together to form a substantially ring-shaped unitary structure adapted to slip over and directly engage a rotating object, the one member being fixed and the other rotary, and means carried by the fixed member and actuated by the rotary member for indicating a measure of the rotation of the rotary member, substantially as described.

22. In an apparatus of the character described, the combination of two members secured together to form a substantially ring-shaped unitary structure adapted to slip over and directly engage a rotating object, the one member being fixed and the other rotary, and a cyclometer carried by the fixed member and actuated by the rotary member for indicating a measure of the rotation of the rotary member, substantially as described.

23. An apparatus of the character described, comprising two annular members, the one fixed and the other rotary, the two members forming a unitary structure adapted to slip over and directly engage a rotating object, and a cyclometer carried by the fixed member and operated by the rotary member, substantially as described.

24. An apparatus of the character described, comprising two annular members, the one fixed and the other rotary, the two members secured together to form a substantially ring-shaped unitary structure adapted to slip over and directly engage a rotating object, with ball bearings and dust excluding washers located between the two members, and a cyclometer carried by the fixed member and actuated by the rotary member, substantially as described.

25. In an apparatus of the character described and adapted for substantially concentric mounting upon a rotating member, the combination of two annular members secured together to form a unitary structure, the one fixed and the other rotary, the two members forming in effect an annular closed casing, and means for indicating a measure of the rotation of the rotary member, substantially as described.

26. A two part odometer, one part rotary and the other non rotary, a pivoted axle, a hub, said hub carrying the rotary part of the odometer and the axle pivot holding from rotation the other part, substantially as described.

In testimony whereof, we affix our signatures, in presence of two witnesses.

HARRY P. C. BROWNE.
WILLIAM H. PALMER, Jr.

Witnesses:
GEORGE L. WILLIAMS,
S. E. MORROW.